United States Patent [19]
Blouin et al.

[11] Patent Number: 5,378,074
[45] Date of Patent: Jan. 3, 1995

[54] TUBULAR CONNECTION

[75] Inventors: Joseph D. Blouin, Sturgis; Keith A. Leu, Dearborn; Larry K. Diller, Fairview, all of Mich.

[73] Assignee: Fabex, Incorporated, Novi, Mich.

[21] Appl. No.: 934,572

[22] Filed: Aug. 24, 1992

[51] Int. Cl.⁶ .............................................. B25G 3/28
[52] U.S. Cl. .................................. 403/284; 285/382.1; 29/517; 403/285
[58] Field of Search ............ 403/284, 285, 279; 285/256, 382, 382.1, 382.2; 29/517, 518, 519

[56] References Cited

U.S. PATENT DOCUMENTS

| | | | |
|---|---|---|---|
| 487,434 | 12/1892 | Steen | 285/382.2 |
| 2,149,814 | 3/1939 | Littlehale | 29/518 |
| 2,327,650 | 8/1943 | Klein | 29/517 |
| 3,274,330 | 9/1966 | Becker | 403/284 |
| 3,530,900 | 9/1970 | Kish | 285/256 |
| 3,822,464 | 7/1974 | Hester | 285/382.2 |
| 4,624,489 | 11/1986 | Nakamura | 285/382 |
| 4,690,435 | 9/1987 | Manning et al. | 285/256 |
| 4,902,048 | 2/1990 | Washizu | 285/382 |
| 5,044,671 | 9/1991 | Chisnell | 285/256 |

*Primary Examiner*—Kurt C. Rowan
*Assistant Examiner*—James Miner
*Attorney, Agent, or Firm*—Irving M. Weiner; Joseph P. Carrier; Pamela S. Burt

[57] ABSTRACT

There is disclosed a novel crimp connection for directly joining metal tubes together. The crimp connection includes at least one circumferential crimp for locking or fixing the tube end portions together, which locking crimp will have varying lateral and radial dimensions. The connection may also include a second type of circumferential crimp for sealing the tube end portions together, which sealing crimp will preferably have substantially constant lateral and radial dimensions; and may include a third type of crimp for stabilizing the sealing crimp against radial and axial forces applied to the tube end portions.

17 Claims, 2 Drawing Sheets

TUBULAR CONNECTION

BACKGROUND OF THE INVENTION

1. Field of the Invention

The present invention pertains to a mechanical coupling or connection for joining rigid tubes together and methods of constructing same. More particularly, the present invention pertains to a mechanically crimped connection for directly joining two rigid (typically metal) tubes together, which connection can withstand axial, radial and rotational forces and may be substantially fluid-tight, and to methods of constructing same.

2. Description of Relevant Art

There are known connections for joining rigid tubes, or tubular components, together, such known connections including brazed, welded or soldered joints, threaded fittings, compression fittings, etc. As used throughout this application, the language "tube" and "tubular component" are used interchangeably to define any component having at least one tubular end portion.

Figure 1A:
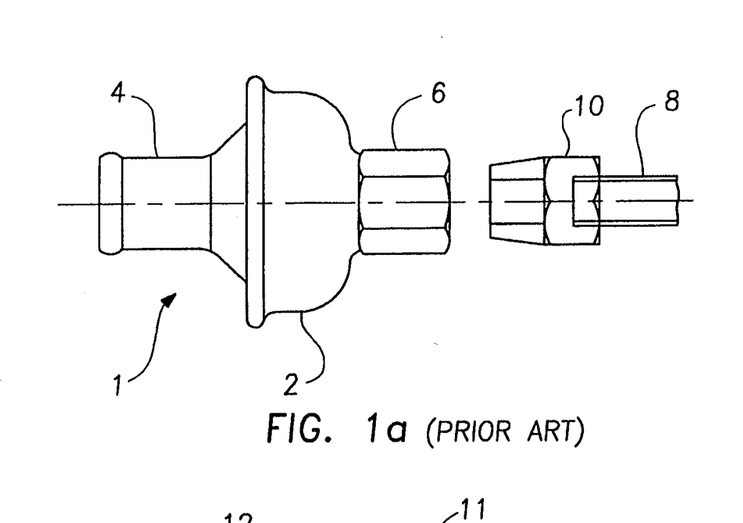
FIG. 1a is a side elevational view of a conventional connection for joining two tubular components together using threaded fittings joined to the tubular components, respectively.

With reference to FIG. 1a of the accompanying drawings, for example, there is shown a threaded connection for two tubular metal components which is and has widely been used in the automotive industries in vehicle emissions systems. In the drawing there is shown a valve member 1 with a metal casing 2, the metal casing having an extruded tubular fitting 4 at one end and a threaded metal connection 6 at the other end thereof. Also shown in FIG. 1 is a rigid metal tube 8 having a threaded fitting 10 at one end thereof and which is adapted to mate with the fitting 6 provided on the valve casing 2, and whereby the fittings 6, 10 function as a substantially fluid-tight connection for two metal tubular components, i.e., one end of the metal valve casing 2 and the metal tube 8. The order of the fittings 6, 10 could be reversed, i.e., such that the female fitting 6 is provided on the tube 8 and the male fitting 10 is provided on the casing 12. Typically the fitting 6 or 10 provided on the casing 12 is formed of low-carbon steel and is crimped to the casing 12, while the fitting on the tube 8 is formed of stainless steel and is welded or brazed to the tube.

Although the threaded connection as shown in FIG. 1 is used extensively today, especially in many high temperature applications where it is not desirable to use a connection having rubber or plastic components, the connection has many problems and disadvantages associated therewith. For example, use of a threaded connection is very expensive not only because the fittings 6, 10 are expensive to manufacture, typically requiring machining, but also because the fittings must be connected to respective tubular members as discussed above, and because joining of the threaded fittings 6, 10 as part of a larger device is labor intensive. In the automotive industry, for example, the fittings 6, 10 would typically be screwed together as a vehicle moves along the assembly line.

Furthermore, the structural nature of the threaded fittings 6, 10 necessarily results in quality control problems, which of course lead to increased warranty costs for makers and sellers of devices using the threaded connections. For example, there is a risk of fluid leaks when using a threaded connection because fluid may leak not only through and around the coupled threads of the fittings, but may also leak at either of the joints, which are typically crimped, welded or brazed, between the threaded fittings and the respective tubular members. Relatedly, tubular joints using such threaded connections may tend to corrode and prematurely fail at any or all of these same three areas. Correspondingly, any quality control program must separately consider each of the three potential areas of fluid leaks.

Many of the above problems and disadvantages also occur when metal tubes are joined together through brazing, soldering or welding without threaded fittings, especially those problems and disadvantages relating to corrosion, fluid leakage and labor requirements needed to effect the connections. Relatedly, although some metals, such as stainless steel, are inherently corrosion resistant and do not require corrosion preventing finishes applied thereto, such metals are typically extremely difficult to braze, solder or weld.

Figure 1B:
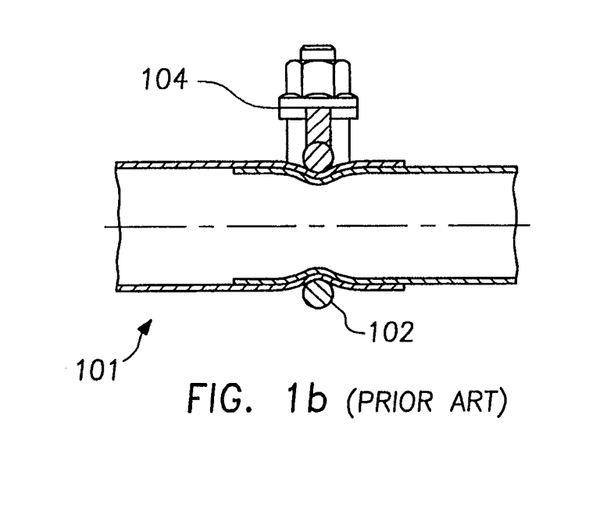
FIG. 1b is a side sectional view of a conventional compression-type connection for joining two tubular components together.

Referring to FIG. 1b, there is shown a known compression type connection 101 which is conventionally used for joining rigid tubular components together, the connection being conventionally referred to as a U-Bolt clamp. The connection 101 comprises a rigid metal ring 102 which would be fitted over the mated end portions of two tubular components and a screw mechanism 104 associated with the ring 102 for tightening same and thereby compressing the tube end portions together. In this regard, to such known compression connection, there are again various problems and disadvantages associated therewith. For example, the U-Bolt clamp, like the threaded connection of FIG. 1a, is relatively expensive not only because the clamp itself is expensive, but also because the process of applying the clamp to two tubular components is relatively labor intensive. Also, the action of tightening the screw mechanism 104 to achieve the necessary connection is difficult to precisely control, so that the precise degree of fluid-tightness associated with the connection may vary to some extent from connection to connection.

Figure 2:
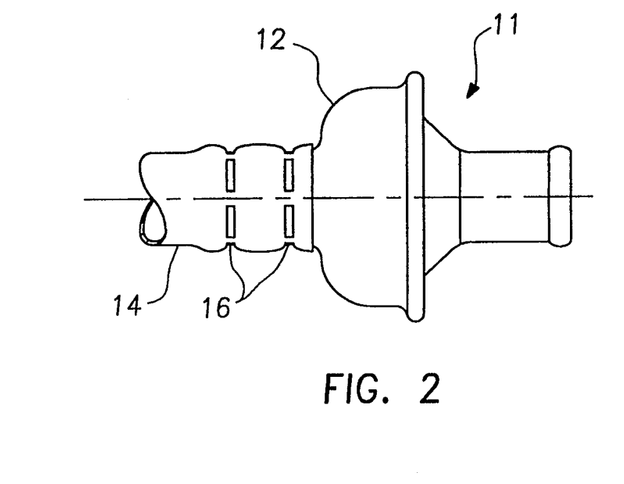
FIG. 2 is a side elevational view of two tubular components joined together with a crimped connection as previously proposed by applicant.

In an effort to overcome the foregoing problems and disadvantages of known connections for joining rigid tubular components, applicant has previously proposed a connection, such as shown in FIG. 2 of the present application, for joining two tubular components formed of low-carbon steel and for joining a tubular component of low-carbon steel to another tubular component of stainless steel. The carbon steel components are provided with an aluminized coating.

With reference to FIG. 2, a valve device 11 has one end of a casing 12 thereof (which has been extruded into a tubular shape) directly joined to the end portion of a tube 14 through a pair of circumferential crimps 16. The casing 12 may be formed of either low-carbon steel or stainless steel and the tube 14 is formed of low-carbon steel. The end portion of the tube 14 is expanded over the end 12 of the valve device, and the crimps 16 (each of which comprises a series of uniform rectangular recesses spaced completely around the circumference of the tubular components) distort or compress portions of the tubular components inwardly and against each other. The crimps 16 function to hold the two tubular components in a fixed relationship to each other and to form a substantially fluid-tight seal therebetween. Such crimps have previously been used for joining a rigid metal tubular component to another tubular component formed of a non-rigid material such as rubber. U.S. Pat. No. 4,690,435, for example, discloses a crimp connection for joining a rubber hose to a metal fitting.

Applicant's previously proposed crimped connection functions very well and represents a significant advancement over known connections for joining rigid tubular components, however, improvements may be necessary as new system requirements become evident.

Specifically regarding applicability, many industries such as the automotive industry now utilize tubular components formed of various metals instead of low-carbon steel, including many corrosion resistant metals such as stainless steel, and of a variety of wall thicknesses, and applicant has discovered that the previous crimped connection cannot be applied to each of the various applications involving the different metals without significant modifications/adaptations specific to each particular application. For example, the low-carbon steel used in the previously proposed crimped connection is easily deformable and can form a relatively high quality seal between two tubular components under a relatively wide range of conditions, whereas stainless steel (which is now required for use in many automotive applications because of its corrosion resistance) is a relatively hard material which can be properly deformed only under a relatively narrow range of conditions.

The present invention has been developed to overcome the foregoing limitations, problems and disadvantages associated with known connections for connecting rigid tubular components, and to generally fulfill a great need in the art for a simple, high quality connection for joining two tubular metal components which can be rapidly effected for simple high quality, more consistent connection.

SUMMARY OF THE INVENTION

According to the invention there is provided a connection for joining metal tubes, comprising means for fixing an end portion of a first metal tube coaxially within a mating end portion of a second metal tube and means for sealing the end portions of the first and second tubes together, the fixing means being separate from and different than the sealing means. The fixing means will preferably include at least one first circumferential crimp defined in the end portions of the first and second metal tubes, the sealing means will preferably include at least one second circumferential crimp defined in the end portions of the first and second metal tubes, and the first and second circumferential crimps will have different shapes.

Additionally, the connection may comprise a stabilizing means, preferably including at least one third circumferential crimp, which third circumferential crimp cooperates with the first circumferential crimp to substantially prevent the second (sealing) circumferential crimp from having vibrations, and radial and axial forces applied thereto.

According to the present invention there is also provided a mechanical connection for joining two rigid tubes together, comprising a circumferential crimp defined in mating end portions of first and second rigid tubes, respectively, the crimp having a varying lateral thickness about the circumference of the tube end portions. Preferably the circumferential crimp will also have varying radial dimensions about the circumference of the tube end portions and will comprise a series of recesses formed in uniformly spaced relationship about the circumference of the tube end portions, each of which recesses has varying lateral and radial dimensions.

Still further according to the invention there is provided a connection for joining metal tubes together comprising a circumferential crimp defined in coaxially disposed, mating end portions of first and second metal tubes, wherein each of the metal tubes is formed of a material other than low-carbon steel. The circumferential crimp will preferably have a substantially uniform lateral width therearound and the total crimp area Z for each crimp ring will preferably fall in the range $Z = (T+V) \, 0.95$, where T is the wall thickness of the end portion of the first metal tube as disposed coaxially over the end portion of the second metal tube and V is the thickness of the second metal tube prior to crimping.

It is an object of the present invention to provide a simple, high-quality mechanical connection for directly joining metal tubular components together.

It is another object of the invention to provide such a mechanical connection which can be quickly, easily and reliably effected.

It is a further object of the invention to provide such a mechanical connection which is substantially fluid-tight.

Yet another object of the invention is to provide such a mechanical connection which can be used for joining tubular components formed of substantially any metal or metal combination, and which have substantially any wall thicknesses and diameters.

Still another object of the invention is to provide such a connection which requires significantly fewer components and/or materials than conventional connections, and which has a correspondingly, significantly reduced cost.

It is also an object of the invention to provide such a connection which can be easily applied to achieve a consistent degree of fluid-tightness between the components.

Other objects, advantages and salient features of the present invention will become apparent from the following detailed description, which, when taken into conjunction with the annexed drawings, discloses preferred embodiments of the present invention.

DETAILED DESCRIPTION OF THE PREFERRED EMBODIMENTS

Referring to FIGS. 3-6 there is shown two tubular components joined together using a crimped connection according to a first preferred embodiment of the invention. Similar to FIG. 2, the two tubular components shown in FIG. 3 comprise a valve device 11 with a metal casing 12 having one end thereof extruded into a tubular shape and a metal tube 14 having one end thereof connected to the valve casing with a crimp connection. Somewhat differently than in FIG. 2, the end of the tube 14 is fitted within the tubular end portion of the casing 12 in a mating relationship, while the tube 14 in FIG. 3 also includes a bead 21 which functions to limit the length of tubing extending into the valve casing 12.

Figure 3:
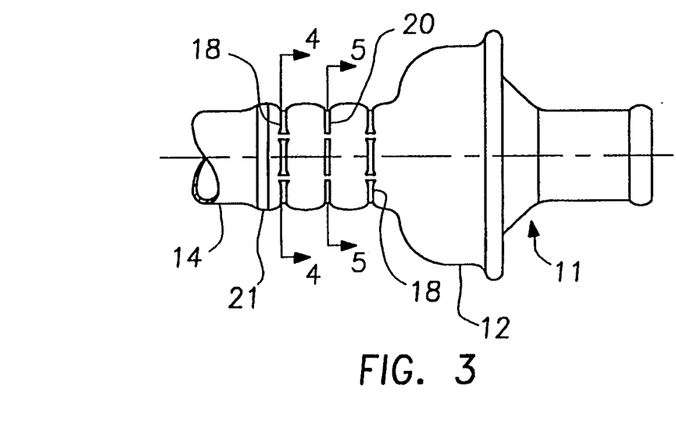
FIG. 3 is a side elevational view of two tubular components joined together with a crimped connection according to a first embodiment of the present invention.

According to the novel aspects of the invention, the crimped connection formed between the tube 14 and the valve casing 12 includes a pair of circumferential crimps 18 defined in the end portions of the valve casing 12 and the tube 14, each of which crimps function to fix or lock the end portions in a given position relative to each other, and a differently shaped circumferential crimp 20 defined in the end portions axially between the locking crimps 18, and which functions to form a substantially fluid-tight seal between the end portions.

Figure 4:
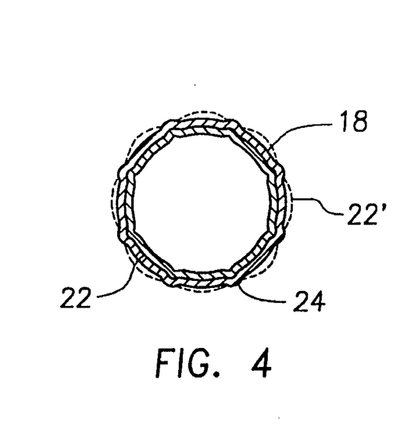
FIG. 4 is a sectional view taken in the direction of line 4—4 in FIG. 3.
Figure 5:
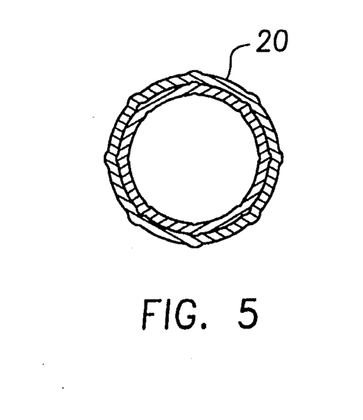
FIG. 5 is a sectional view taken in the direction of line 5—5 in FIG. 3.
Figure 6:
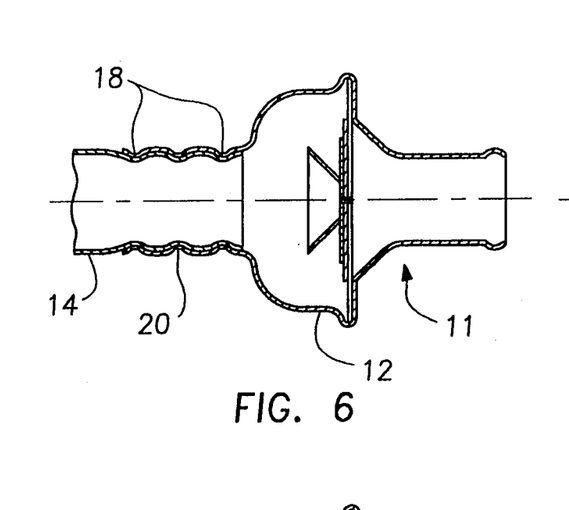
FIG. 6 is similar to FIG. 3 but shows a sectional view of a modification of the joined tubular components.

As shown, the crimps 18, 20 have different shapes not only in external appearance as indicated in FIG. 3, but also in internal appearance, as shown in FIGS. 4-6. Specifically, the sealing crimp 20 is somewhat similar to the crimps 16 according to applicant's previously proposed crimped connection in that the crimp 20 is defined by a series of substantially rectangularly shaped recesses (eight in the depicted structure) formed in equally spaced relationship about the circumference of the tube end portions. The recesses of the crimp 20 are quite different than the recesses according to the previously proposed crimp 16, however, in that the recesses of the crimp 20 have a narrower lateral width and a more precisely and carefully controlled crimp diameter, as discussed further hereinbelow in relation to the second preferred embodiment of the invention. Internally, the sealing crimp 20 distorts the tube end portions uniformly inwardly such that the dimensions of the tube portions are reduced, but otherwise remain substantially circular as shown in FIG. 5. Applicant has determined that such a crimp is particularly effective in achieving a substantially fluid-tight seal between the tube end portions.

In contrast, although the locking crimps 18 are also defined by a series of recesses (again eight are depicted) formed in equally spaced relation around the circumference of the end portions, the recesses of the crimps 18 each have a varying lateral width, as best shown in FIG. 3, and also have a varying radial dimension as best shown in FIG. 4. According to the preferred embodiment, each of the recesses of the crimp 18 preferably has an intermediate section with a narrower lateral width and end sections which flare out from the intermediate section to have a greater lateral width, while the distorted circumference or radial width of the tube end portions is defined by an alternating pattern of pinch points 22 (corresponding to the narrower intermediate sections of the recesses) and bubbles 24 (corresponding to the wider end sections of the recesses). It will be appreciated that the sectional views of FIGS. 4 and 5 are not to scale, but have been somewhat exaggerated to emphasize the differences between the two crimps. Applicant has found that the crimps 18 with varying lateral and radial dimensions are particularly effective for locking or fixing the tube end portions in position relative to each other, much more so than the substantially rectangular recesses of the sealing crimp 20 or the crimp 16 according to the previously proposed connection.

Each of the crimps 18, 20 may be generally classified as a "bubble crimp" such as the crimp 16 shown in FIG. 2 or the crimp shown in U.S. Pat. No. 4,690,435 as discussed above, and the crimps 18, 20 may be formed using appropriate conventional apparatus and methods. Applicant has found, however, that the best quality crimped connections are achieved when the two locking crimps 18 and the sealing crimp 20 are formed simultaneously. Applicant has also found that the best results are achieved when the dimensions of the sealing crimp 20 are determined before the dimensions of the locking crimps 18 for any given application.

The number and size of the recesses included in each of the crimps 18, 20 can vary for each given application depending on several factors such as the diameters of the tubes, the materials of the tubes, the wall thicknesses of the tubes, etc. Applicant has found, however, that the recesses of the sealing crimp 20 should preferably be at least as narrow as the narrowest section of the recesses in the locking crimp 18, and that the diameter of the sealing crimp 20 should be at least as small as the average diameter of the locking crimp 18; and that neither of the crimps 18, 20 should reduce the inner diameter of the tubular components as nominally fitted/mated in coaxial relation more than 20% of their precrimped sizes.

As an example, applicant has found that for a connection joining two tubular components in which the outer diameter of the outer tube is ⅝" (16 mm), and the tubes are formed of carbon steel or stainless steel, each of the crimps 18, 20 may include eight recesses ¼" (6 mm) long, while the lateral width of the sealing recesses may be 0.04" (1 mm) and the lateral width of the locking recesses may be 0.04" (1 mm) at intermediate sections thereof and increase to 0.08" (2 mm) at end sections thereof. Additionally, the average crimp diameter of the crimps 18, 20 should each be in the range of $0.80-0.95 \times D_0$, and most preferably in the range of $0.85-0.90 \times D_0$, where $D_0$ is the nominal tube diameter prior to being crimped.

Referring to FIG. 6, there is shown a side sectional view of the crimp according to the first embodiment of the present invention, although the tube 14 is slightly modified in comparison to FIG. 3 in that it does not include the bead 21.

Although the embodiment of the invention shown in FIGS. 3-6 is preferred, it will be understood to persons of ordinary skill in the art, that various modifications and variations of the depicted crimp connection may be made without departing from the spirit and scope of the invention, especially noting that the invention is adaptable to any combination of tubular components, including components with different compositions, wall thicknesses, diameters, etc., and that different degrees of fluid-tightness may be desired. For example, the lateral width of the recesses of the sealing crimp 20 may be increased to a width greater than the width of the intermediate section of the locking crimps 18 or to a width equal to or greater than that of the sealing crimp 16 according to applicant's previously proposed connection. Applicant has found, however, that best results are achieved with the narrower recesses, as discussed above.

Similarly, the recesses of the locking crimps 18 could be modified to have some alternative shape with varying lateral and radial dimensions, such as an ellipse or a substantially rectangular box having a wider intermediate section and narrower end sections which taper inwardly from the intermediate section. Applicant has found, however, that such alternative shapes for the recesses are not as effective as the shape shown in FIG. 3 for locking the two tubular components together, because shapes with narrower end sections tend to become loose more quickly than the shapes with the wider end sections in that the material in the narrow end sections can be forced to move into the wider intermediate sections more easily than the material of the wider end sections can be forced into the narrower intermediate sections.

Further, the tool used in forming the recesses of the locking crimps 18 could be structured such that bubble points 22' in the varying radial thickness of the crimped tube portions are defined at the narrower intermediate sections of the recesses (as indicated by the dotted lines in FIG. 4), while pinch points in the varying radial thicknesses would be defined at the flared end sections of the recesses. Applicant has found that such alternative structure for the locking crimps 18 to be equally effective to the disclosed structure including pinch points 22 and bubble points 24, and that the two alternative structures are each preferred in certain applications depending on the materials, wall thicknesses and diameters of the tubular end portions.

Figure 7:
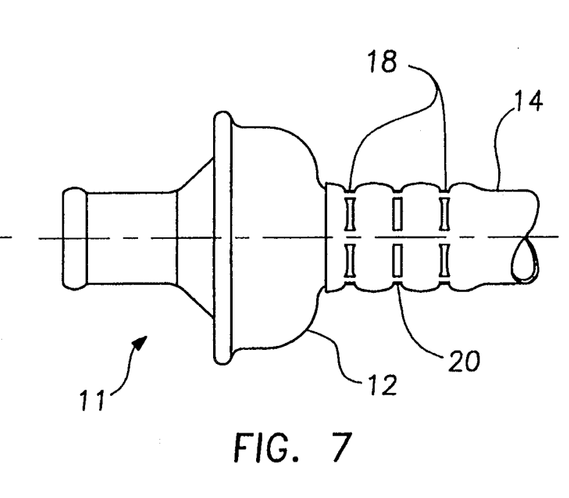
FIG. 7 is a side elevational view showing another modification of the embodiment of FIG. 3.

Relatedly, and as shown in FIG. 7, the male/female relationship of the end portions of the two tubular components may be reversed, such that the end portion of the tube 14 is expanded to fit over the end portion of the casing 12, again depending on the compositions and relative dimensions of the two tubular components, and that either arrangement functions equally well. Also, it will be understood that the alternative arrangement of FIG. 7, like FIG. 6, does not include a bead 21 as shown in FIG. 3.

In this regard, applicant has determined that the particular arrangement of the tubular components, i.e., whether the end of the tube 14 is disposed within the end of the valve casing 12 as shown in FIG. 3 or is disposed over the end of the valve casing 12 as shown in FIG. 7, is primarily determined by the wall thickness and material combinations of the two components. Specifically, applicant has determined that to achieve the best locking and sealing characteristics between the tubes, the internally disposed tube should have a higher springback rate (relative to the applied crimp) than does the externally disposed tube; and that such springback rate is greatly affected by tube wall thickness because the heavier the wall, the less the tube will spring back after crimping. Another, less significant factor affecting springback rate is the type of material(s) the tubes are formed of. For example, 304 stainless steel has approximately a 30% greater springback rate than does 409 stainless steel.

Still further, although the preferred embodiment shown in FIGS. 3-6 includes a pair of the locking crimps 18 and a single sealing crimp 20, it will be understood that the invention could alternatively include varying numbers of the locking crimps 18 and the sealing crimp 20 and any feasible combination is intended to be covered by the present invention. For example, the crimp connection could include a single locking crimp 18 together with a single sealing crimp 20; a plurality of sealing rings defined between a pair of the locking rings; a plurality of sealing crimps could be arranged in an alternating pattern with a plurality of locking crimps, etc. As a practical matter, however, applicant has determined that little or no improvement is achieved in the quality of the crimped connection if the total, combined number of locking and sealing crimps is increased beyond four.

Relatedly, and further to the above discussion that the tube's inner diameter should not be decreased more than 20% by the locking and sealing crimps, applicant has determined that the depth of the locking and sealing crimps 18, 20 is required to be modified for any given application depending on the total number of crimps being used in the connection because there is a desirable limit for the amount of total compression which the tube ends may be subjected to before they are undesirably damaged, such as by being crushed. Thus, if a two crimp connection and a three crimp connection were used to join identical tubular components together, the crimps of the two crimp connection would preferably be formed more deeply into the tubular end portions than would the crimps of the three crimp connection.

A second preferred embodiment of the present invention encompasses the use of one or more locking crimps by themselves, i.e., without any sealing crimps, as a connection for joining two metal tubular components.

Similarly, a third preferred embodiment of the invention encompasses the use of one or more sealing crimps by themselves as a connection for joining two metal tubular components and wherein each of the tubular components is formed of a material other than low-carbon steel. Such connection according to the third embodiment will most preferably include a pair of the sealing crimps spaced axially along the tube end portions substantially in the same manner as the previously proposed crimp shown in FIG. 2, although each of such sealing crimps will have a more precisely defined radial and lateral dimensions based on the composition(s) and structural dimensions of the tubular components. Particularly, the total crimp area Z for each of the sealing crimps according to the third embodiment is defined by the equation $Z=(T+V)\,0.95$, where T is the wall thickness of one component and V is the wall thickness of the other component prior to crimping. Preferably the crimp connection will include at least two of the sealing rings. Additionally, the lateral width of the crimp recesses is typically much narrower than the lateral width of the sealing crimps 16 according to applicant's previously proposed connection shown in FIG. 2.

Tables I-V below present actual results of tests performed on various crimp connections. The crimp in Table I included two crimp rings according to the previously proposed design shown in FIG. 2 applied to a low carbon steel tube, 0.750" O.D. and 0.049" wall thickness, expanded over one end of a low carbon steel valve casing; the crimp in Table II also included two crimps according to the previously proposed design in FIG. 2 applied to a 304 ss tube, 0.750" O.D. and 0.049" wall thickness, expanded over one end of a 304 ss valve casing; the crimp in Table III included two locking crimps and one sealing crimp according to the embodiment shown in FIG. 7 applied to the same tubular components as discussed in relation to Table II; the crimp in Table IV included two locking crimps and one sealing crimp according to the embodiment shown in FIG. 7 applied a 409 ss tube, 0.750″ O.D. and 0.042″ wall thickness, expanded over one end of a 304 ss valve casing; and the crimp in Table V included two sealing rings according to an embodiment of the present invention applied to a 409 ss tube, 0.750″ O.D. and 0.042″ wall thickness, expanded over one end of a 304 valve casing.

As reflected in the test results: the previously proposed crimp functioned very adequately for the low carbon steel components, but did not function adequately for the 304 ss components; the three crimp design according to the present invention worked exceptionally well for joining two 304 ss components and for joining a 304 ss component to a 409 ss component; and the two sealing crimp design according to the present invention functioned adequately for joining a 304 ss component to a 409 ss component.

The values recorded in the AVG CRIMP DIA column are the average crimp diameters (Inches) measured on each of the samples.

The values recorded in the TENSILE FAILURE column are the tensile failure loads (Pounds) after the sample was pulled to failure.

The data recorded in LEAK RATE A is the leak rate (SLPM) recorded after the sample was placed in progressive tension until 500 pounds then released and leak tested.

The data recorded in LEAK RATE B is the leak rate (SLPM) recorded after the sample was subjected to oscillation testing with a 100 in-lb torque at 5 Hertz for 100,000 cycles.

TABLE I

| SAMPLE NO. | AVG CRIMP DIA | TENSILE FAILURE | LEAK RATE A | LEAK RATE B |
| --- | --- | --- | --- | --- |
| 1 | 0.733 | 1888 | 0.25 | NA |
| 2 | 0.739 | 1865 | 0.15 | NA |
| 3 | 0.735 | 1573 | 1.50 | NA |
| 4 | 0.737 | 1989 | 0.15 | NA |
| 5 | 0.735 | 2034 | 0.00 | NA |
| 6 | 0.734 | 2067 | 0.75 | NA |
| 7 | 0.736 | NA | NA | 3.50 |
| 8 | 0.736 | NA | NA | 4.00 |
| 9 | 0.734 | NA | NA | 1.25 |
| 10 | 0.739 | NA | NA | 3.75 |
| 11 | 0.736 | NA | NA | 2.50 |
| 12 | 0.735 | NA | NA | 4.00 |

TABLE II

| SAMPLE NO. | AVG CRIMP DIA | TENSILE FAILURE | LEAK RATE A | LEAK RATE B |
| --- | --- | --- | --- | --- |
| 1 | 0.742 | 1483 | 1.75 | NA |
| 2 | 0.744 | 1494 | 3.75 | NA |
| 3 | 0.744 | 1449 | 3.00 | NA |
| 4 | 0.740 | 1433 | 1.50 | NA |
| 5 | 0.741 | 1404 | 0.25 | NA |
| 6 | 0.739 | 1191 | 1.00 | NA |
| 7 | 0.742 | NA | NA | * |
| 8 | 0.743 | NA | NA | * |
| 9 | 0.742 | NA | NA | * |
| 10 | 0.734 | NA | NA | * |
| 11 | 0.738 | NA | NA | * |
| 12 | 0.740 | NA | NA | * |

TABLE III

| SAMPLE NO. | AVG CRIMP DIA | TENSILE FAILURE | LEAK RATE A | LEAK RATE B |
| --- | --- | --- | --- | --- |
| 1 | 0.772 | >3000 | 0.00 | NA |
| 2 | 0.773 | >3000 | 0.00 | NA |
| 3 | 0.772 | >3000 | 0.00 | NA |
| 4 | 0.769 | >3000 | 0.00 | NA |
| 5 | 0.711 | >3000 | 0.00 | NA |
| 6 | 0.772 | >3000 | 0.00 | NA |
| 7 | 0.770 | NA | NA | 0.10 |
| 8 | 0.773 | NA | NA | 0.15 |
| 9 | 0.771 | NA | NA | 0.40 |
| 10 | 0.774 | NA | NA | 0.35 |
| 11 | 0.769 | NA | NA | 0.30 |
| 12 | 0.770 | NA | NA | 0.40 |

TABLE IV

| SAMPLE NO. | AVG CRIMP DIA | TENSILE FAILURE | LEAK RATE A | LEAK RATE B |
| --- | --- | --- | --- | --- |
| 1 | 0.769 | 2135 | 0.10 | NA |
| 2 | 0.770 | 1989 | 0.15 | NA |
| 3 | 0.771 | 2022 | 0.10 | NA |
| 4 | 0.765 | 1708 | 0.10 | NA |
| 5 | 0.769 | 1697 | 0.00 | NA |
| 6 | 0.771 | 1955 | 0.10 | NA |
| 7 | 0.773 | NA | NA | 0.25 |
| 8 | 0.762 | NA | NA | 0.15 |
| 9 | 0.769 | NA | NA | 0.10 |
| 10 | 0.772 | NA | NA | 0.30 |
| 11 | 0.764 | NA | NA | 0.25 |
| 12 | 0.771 | NA | NA | 0.10 |

TABLE V

| SAMPLE NO. | AVG CRIMP DIA | TENSILE FAILURE | LEAK RATE A | LEAK RATE B |
| --- | --- | --- | --- | --- |
| 1 | 0.733 | 1888 | 0.25 | NA |
| 2 | 0.739 | 1865 | 0.15 | NA |
| 3 | 0.735 | 1573 | 1.50 | NA |
| 4 | 0.737 | 1989 | 0.15 | NA |
| 5 | 0.735 | 2034 | 0.00 | NA |
| 6 | 0.734 | 2067 | 0.75 | NA |
| 7 | 0.736 | NA | NA | 3.50 |
| 8 | 0.736 | NA | NA | 4.00 |
| 9 | 0.734 | NA | NA | 1.25 |
| 10 | 0.739 | NA | NA | 3.75 |
| 11 | 0.736 | NA | NA | 2.50 |
| 12 | 0.735 | NA | NA | 4.00 |

Figure 8A:
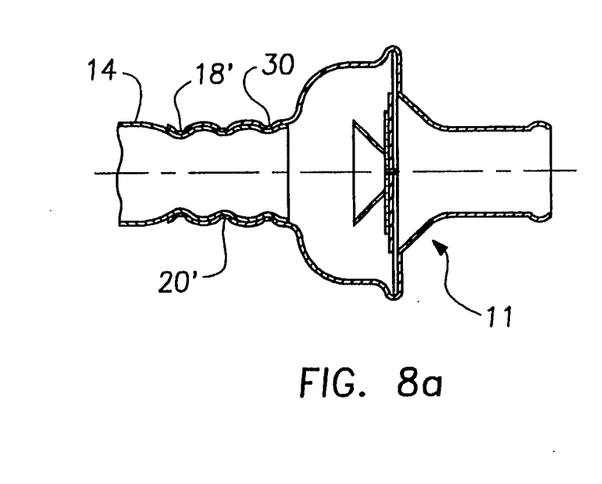
FIGS. 8a and 8b are side sectional views of two tubular components joined together similar to FIG. 6, but with a crimped connection according to another embodiment of the invention.
Figure 8B:
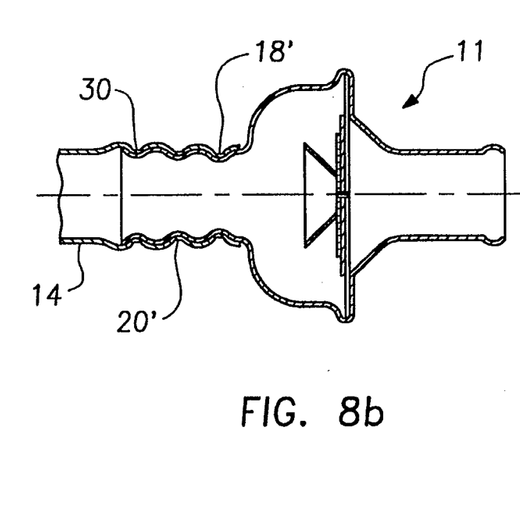

Referring to FIGS. 8a and 8b, there are shown two tubular components joined together using a crimp connection according to a fourth preferred embodiment of the invention. The difference between FIGS. 8a and 8b is that the end of the tube 14 is swaged into the end of the valve casing 12 in FIG. 8a, while it is expanded over the end of the valve casing in FIG. 8b.

The tubular components are a valve 11 and a tube 14 similar to those shown in FIG. 3, but the crimped connections are different from that shown in FIG. 3 because each of the connections includes three types of crimps, a locking crimp 18′, a sealing crimp 20′ and a stabilizing crimp 30. The locking crimp 18′ and the sealing crimp 20′ are substantially the same as those shown in FIGS. 3-6 except that the locking crimp 18′ is formed deeper into tube end portions than is the sealing crimp 20′, while the stabilizing crimp 30 replaces one of the locking crimps 18 shown in FIG. 3 and is formed less deeply into the tube end portions than is the sealing crimp 20′. Thus the three crimps 18′, 20′ and 30 are formed with progressively increased diameters axially along the robe end portions. In FIG. 8a the crimp diameters increase toward the valve device 11, while in FIG. 8b the diameters increase away from the valve device.

The stabilizing crimp 30 preferably includes a plurality of recesses having the same outwardly appearing shape as the recesses of the locking crimp 18', although the recesses will be formed much less deeply into the end portions of the tubular components 12, 14 than either the locking crimp 18' or the sealing crimp 20' as discussed above so that the overall, three-dimensional shape of the stabilizing crimp 30 is different from that of the locking and sealing crimps 18', 20'. The stabilizing crimp 30 functions to isolate the sealing crimp 20' against vibrations and particularly against movements in the radial and axial direction of the tubular components so that the sealing crimp 20 can maintain a high quality seal. Although use of a second locking crimp 18 as shown in FIG. 3 or a second sealing ring 20 in place of the stabilizing crimp 30 may also function to isolate an inwardly disposed sealing crimp against undesired vibrations and radial forces, the stabilizing crimp 30 is easier to form, is less likely to damage the tubes, and functions equally well in many applications.

As an example of relative dimensions of the 3 different crimps according to the second embodiment, the locking crimp 18' may reduce the nominal inner diameters of the tube portions prior to crimping up to approximately 20%, the sealing crimp may reduce the nominal inner diameters by up to approximately 15% and the stabilizing crimp may reduce the nominal inner diameters by up to approximately 10%.

Although there have been described what are at present considered to be the preferred embodiments of the present invention, it will be understood by those skilled in the art that various changes and modifications can be made therein without departing from the spirit and scope of the invention, and accordingly all matter contained in the above description and illustrated in the accompanying drawings shall be interpreted to be illustrative and not in a limiting sense.

The scope of the invention is indicated by the appended claims rather than by the foregoing description.

We claim:

1. A connection for joining metal tubes such that a fluid communication path is established between the tubes, the connection comprising:
   means for fixing an end portion of a first metal tube coaxially within an end portion of a second metal tube;
   means for sealing said end portions against each other;
   said fixing means being separate from and different from said sealing means;
   said fixing means including at least one first circumferential crimp defined in metal engaging surfaces of both said end portions;
   said sealing means including at least one second circumferential crimp defined in metal engaging surfaces of both said end portions;
   said first and second circumferential crimps having different shapes; and
   said fixing means includes a pair of said first circumferential crimps spaced axially from each other along said end portions, and said second circumferential crimp is disposed axially intermediate said pair of first circumferential crimps.

2. A connection according to claim 1, wherein said end portion of said first metal tube has a greater crimp springback rate than does the end portion of said second metal tube.

3. A connection for joining metal tubes such that a fluid communication path is established between the tubes, the connection comprising:
   means for fixing an end portion of a first metal tube coaxially within an end portion of a second metal tube;
   means for sealing said end portions against each other;
   said fixing means being separate from and different from said sealing means;
   said fixing means including at least one first circumferential crimp defined in metal engaging surfaces of both said end portions;
   said sealing means including at least one second circumferential crimp defined in metal engaging surfaces of both said end portions;
   said first and second circumferential crimps having different shapes; and
   said first circumferential crimp has a varying lateral thickness therearound and said second circumferential crimp has a substantially constant lateral thickness therearound.

4. A connection according to claim 3, wherein said lateral thickness of said second circumferential crimp is less than or equal to a lateral width of a narrowest portion of said first circumferential crimp.

5. A connection according to claim 3, wherein said sealing means consists of said second circumferential crimp and forms a substantially fluid-tight seal between said end portions.

6. A connection according to claim 3, wherein said first and second circumferential crimps are formed simultaneously in said end portions.

7. A connection according to claim 3, wherein a reduced diameter of said end portions at said second circumferential crimp is less than or equal to a reduced diameter of said end portions at said first circumferential crimp.

8. A connection for joining metal tubes such that a fluid communication path is established between the tubes, the connection comprising:
   means for fixing an end portion of a first metal tube coaxially within an end portion of a second metal tube;
   means for sealing said end portions against each other;
   said fixing means being separate from and different from said sealing means;
   said fixing means including at least one first circumferential crimp defined in metal engaging surfaces of both said end portions;
   said sealing means including at least one second circumferential crimp defined in metal engaging surfaces of both said end portions;
   said first and second circumferential crimps having different shapes; and
   said first and second circumferential crimps have different lateral and radial dimensions.

9. A connection for joining metal tubes together such that a fluid communication path is established between the tubes, the connection comprising:
   at least one circumferential crimp defined in coaxially disposed, mating end portions of first and second metal tubes, said circumferential crimp having a varying lateral thickness therearound, and also having a varying radial dimension therearound;
   a diameter of each said circumferential crimp is within a range of $0.80D_0$–$0.95D_0$, where $D_0$ is a nominal diameter of said mating end portions prior to being crimped; and each said circumferential crimp comprising a plurality of recesses formed in equally spaced relation about the circumference of said end portions of the metal tubes, each said recess having an intermediate section with a narrow lateral width and a pair of end sections which flare out from the intermediate section to have a wider lateral width.

10. A connection for joining metal tubes such that a fluid communication path is established between the tubes, the connection comprising:

means for fixing an end portion of a first metal tube coaxially within an end portion of a second metal tube;

means for sealing said end portions against each other;

said fixing means being separate from and different from said sealing means;

said fixing means including at least one first circumferential crimp defined in metal engaging surfaces of both said end portions;

said sealing means including at least one second circumferential crimp defined in metal engaging surfaces of both said end portions;

said first and second circumferential crimps having different shapes; and the diameters of said first and second circumferential crimps are within the range $0.80D_0$–$0.95D_0$, where $D_0$ is a nominal tube diameter of said end portions prior to being crimped.

11. A connection for joining metal tubes together, comprising:

a pair of circumferential crimps defined in coaxially disposed, mating end portions of first and second metal tubes, each of said first and second metal tubes being formed of a material other than low-carbon steel; and each said circumferential crimp having a substantially uniform lateral width therearound and a total crimp area Z of each said circumferential crimps being defined by the equation $Z=0.95(T+V)$, where T is the wall thickness of the end portion of the first metal tube as disposed coaxially over the end portion of the second metal tube and V is the wall thickness of the second metal tube prior to crimping.

12. A connection according to claim 11, including a pair of said circumferential crimps spaced axially along the end portions of said metal tubes, each said crimp comprises a plurality of recesses formed in uniformly spaced relation about the circumference of said end portions and said crimps forming a substantially fluid-tight seal between the end portions.

13. A connection according to claim 11, wherein each of said first and second metal tubes are formed of stainless steel.

14. A connection for joining metal tubes together so as to establish a substantially fluid-tight fluid communication path between the tubes, the connection consisting essentially of:

at least one first circumferential crimp formed in coaxially disposed mating metal end portions of both first and second metal tubes, each said first circumferential crimp having a varying lateral thickness therearound; and at least one second circumferential crimp formed in said end portions of both said first and second metal tubes, each said second circumferential crimp having a substantially constant lateral thickness therearound.

15. A connection for joining metal tubes such that a fluid communication path is established between the tubes, the connection comprising:

means for fixing an end portion of a first metal tube coaxially within an end portion of a second metal tube;

means for sealing said end portions against each other;

said fixing means being separate from and different from said sealing means;

said fixing means including at least one first circumferential crimp defined in metal engaging surfaces of both said end portions;

said sealing means including at least one second circumferential crimp defined in metal engaging surfaces of both said end portions;

said first and second circumferential crimps having different shapes;

means for stabilizing said end portions relative to each other, said stabilizing means being separate from and different from said fixing means and said sealing means;

said stabilizing means including at least one third circumferential crimp defined in engaging surfaces of said end portions; and each of said first, second and third circumferential crimps having a different radial dimension.

16. A connection according to claim 15, wherein said second circumferential crimp is disposed axially between said first circumferential crimp and said third circumferential crimp on said end portions, and said second circumferential crimp has a diameter which is intermediate the diameters of said first and third circumferential crimps.

17. A connection according to claim 15, wherein said second circumferential crimp is disposed axially between said first and third circumferential crimps on said end portions of the metal tubes.

* * * * *

UNITED STATES PATENT AND TRADEMARK OFFICE
CERTIFICATE OF CORRECTION

PATENT NO. : 5,378,074
DATED : January 3, 1995
INVENTOR(S) : Blouin et al.

It is certified that error appears in the above-indentified patent and that said Letters Patent is hereby corrected as shown below:

Column 10, line 66, change "robe" to --tube--.

Signed and Sealed this

Seventh Day of March, 1995

Attest:

BRUCE LEHMAN

*Attesting Officer*      *Commissioner of Patents and Trademarks*